(12) United States Patent
Waltman (10) Patent No.: US 9,886,054 B1
(45) Date of Patent: Feb. 6, 2018

(54) CLUTCH LEVER HOLDING DEVICE AND KIT THEREFOR AND METHOD OF OPERATION

(71) Applicant: Brian Waltman, North Wales, PA (US)

(72) Inventor: Brian Waltman, North Wales, PA (US)

( * ) Notice: Subject to any disclaimer, the term of this patent is extended or adjusted under 35 U.S.C. 154(b) by 155 days.

(21) Appl. No.: 14/852,741

(22) Filed: Sep. 14, 2015

Related U.S. Application Data (60) Provisional application No. 62/050,311, filed on Sep. 15, 2014.

(51) Int. Cl.
*B62K 23/06* (2006.01)
*G05G 5/06* (2006.01)

(52) U.S. Cl.
CPC ..................... *G05G 5/06* (2013.01)

(58) Field of Classification Search
CPC . B62K 23/06; G05G 1/04; G05G 5/06; B62L 3/02; B60T 7/105; F16D 23/12; B23B 49/026; F16H 61/18
See application file for complete search history.

(56) References Cited

U.S. PATENT DOCUMENTS

| 4,188,834 A * | 2/1980 | Wakatsuki | B62K 23/06 477/203 |
| 4,215,257 A * | 7/1980 | Repplinger | H01H 23/146 200/322 |
| 4,667,785 A * | 5/1987 | Toyoda | B62K 23/02 192/13 A |
| 5,230,562 A * | 7/1993 | Nishimi | B01F 7/0045 366/262 |
| 5,829,281 A | 11/1998 | Yamashita et al. | |
| 6,263,754 B1 | 7/2001 | Wesling et al. | |
| 7,992,690 B2 * | 8/2011 | Cross | B62K 23/06 188/24.18 |
| 2007/0012136 A1 | 1/2007 | Burner et al. | |

OTHER PUBLICATIONS http://shop.terratrike.com/Locking-Brake-Lever-Set-p/tt600178.htm.

* cited by examiner

*Primary Examiner* — Thomas C Diaz
(74) *Attorney, Agent, or Firm* — Joseph E. Maenner; Maenner & Associates, LLC (57) ABSTRACT

A clutch lever holding assembly includes a bracket and a spring bolt assembly extending through the bracket. The spring bolt assembly includes an elongate housing having a top end, a bottom end, and a through passage extending between the top end and the bottom end. A securing pin extends through the through passage. The securing pin has a thumb portion and a clutch lever engaging portion. A biasing member is disposed in the through passage and biases the securing pin in an upward position. A kit for installing the device and a method for installing the device are also provided.

10 Claims, 8 Drawing Sheets

CLUTCH LEVER HOLDING DEVICE AND KIT THEREFOR AND METHOD OF OPERATION

CROSS-REFERENCE TO RELATED APPLICATION

The present application claims priority from U.S. Provisional Patent Application Ser. No. 62/050,311, filed on Sep. 15, 2014, which is incorporated herein by reference in its entirety.

BACKGROUND OF THE INVENTION

A motorcycle clutch is engaged and disengaged by use of a control lever located on the left hand side of the handlebars. The engine is disengaged from the transmission by pulling the clutch control lever toward the handlebar handle against spring biasing generated by the clutch mechanism. The clutch is required to allow the transmission gears to be changed smoothly without damage and to stop the motorcycle from moving while in gear with the engine running.

Typically, as a motorcycle is stopped for a traffic control signal, the clutch is disengaged and the transmission is downshifted to first gear so that the motorcycle will be ready to move forward when the rider decides to proceed. It is recommended to leave the motorcycle in gear and hold the clutch control lever in the disengage position while waiting for traffic to move forward. Holding the clutch lever in the disengage position requires a significant amount of effort and can cause hand stress and muscle fatigue.

It would be beneficial to provide a device that maintains the clutch lever in the disengaged position without requiring the rider to manually hold the clutch lever in the disengaged position.

BRIEF SUMMARY OF THE PRESENT INVENTION

Briefly, the present invention provides a clutch lever holding assembly comprising a bracket having a first end and a second end. The first end has a clutch lever engaging opening. A spring bolt assembly extends through the clutch lever engaging opening. The spring bolt assembly comprises an elongate housing having a top end, a bottom end, and a through passage extending between the top end and the bottom end. The through passage has a first diameter at the top end, a second diameter at the bottom end, smaller than the first diameter, and a third diameter between the top end and the bottom end. The third diameter is smaller than the first diameter and larger than the second diameter. A securing pin extends through the through passage. The securing pin has a thumb portion and a clutch lever engaging portion. The thumb portion has a diameter smaller than the first diameter and larger than the third diameter, and the clutch lever engaging portion has a diameter smaller than the second diameter. A biasing member is disposed in the first and second diameters of the through passage such that the biasing member biases the securing pin in an upward position.

The present invention also provides a kit comprising the clutch lever holding assembly and a drill fixture.

The present invention also provides a method for installing and for operating the clutch lever holding assembly.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

In the drawings, like numerals indicate like elements throughout. Certain terminology is used in the following description for convenience only and is not limiting. The terminology includes the words above specifically mentioned, derivatives thereof and words of similar import. The terms "upward" or "upwardly" as used herein is defined to mean generally an upward vertical direction; the terms "downward" or "downwardly" as used herein is defined to mean generally a downward vertical direction; and the terms "inward" or "inwardly" as used herein is defined to mean a direction generally toward a longitudinal centerline of a motorcycle on which the present invention is used. The embodiments described and illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Figure 5:
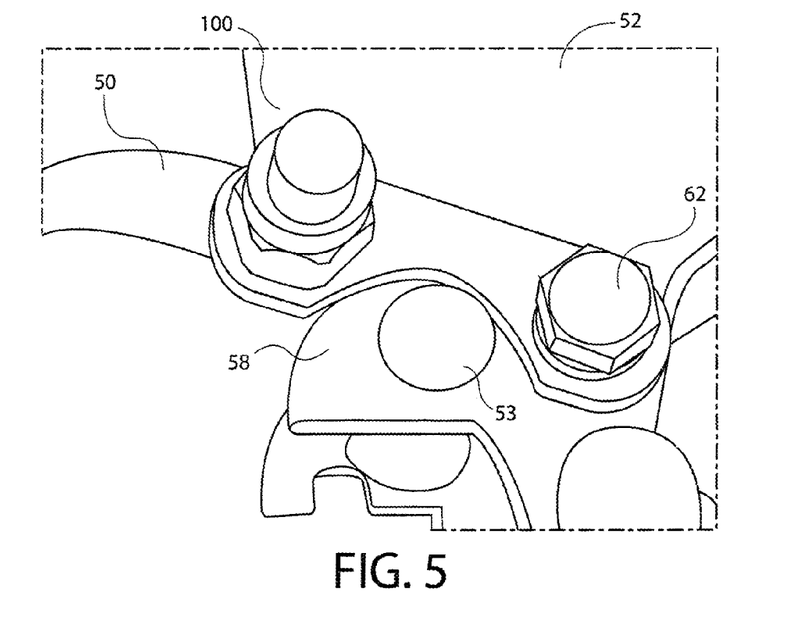
FIG. 5 is a perspective view of the clutch lever holding device of FIG. 1 attached to a motorcycle clutch lever perch, with the clutch in an engaged position.
Figure 6:
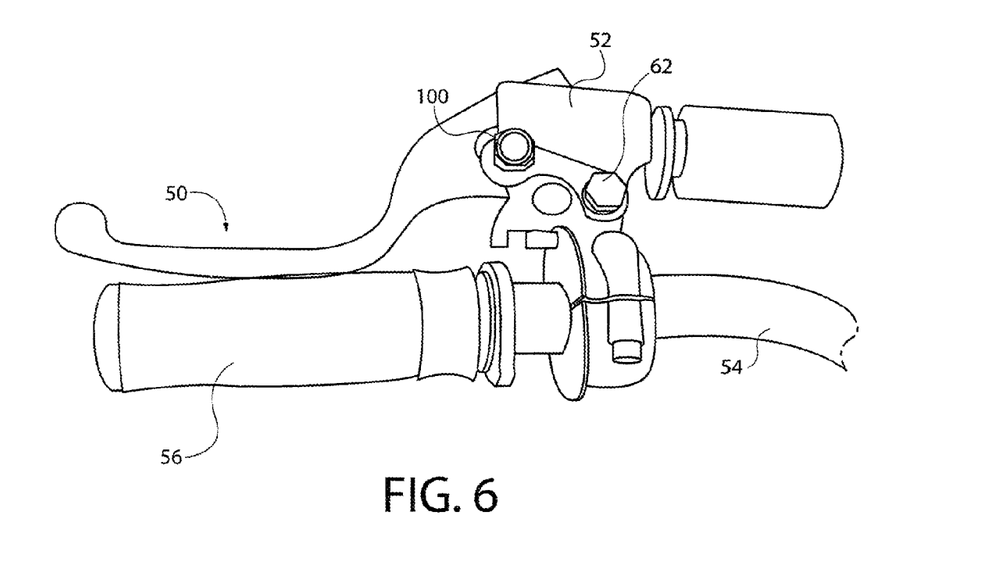
FIG. 6 is a top plan view of the clutch lever holding device of FIG. 1 attached to the motorcycle clutch lever perch, with the clutch in a disengaged position, and the clutch lever holding device is engaged.

Referring to the Figures, a clutch lever holding device 100 ("holding device 100") according to a first exemplary embodiment of the present invention is shown. In an exemplary embodiment, as shown in FIG. 6, holding device 100 is used to restrain a clutch lever 50 on a motorcycle (not shown), although those skilled in the art will recognize that holding device 100 can be used to restrain other types of levers as well. Holding device 100 is used to restrain clutch lever 50 so that a clutch (not shown) is in a disengaged position. FIG. 5 shows clutch lever 50 in an engaged position and FIG. 6 shows clutch lever 50 in a disengaged position.

When clutch lever 50 is in the engaged position, holding device 100 is in a disengaged condition, while, when clutch lever 50 is in the disengaged position, holding device 100 can be in an engaged condition. Holding device 100 uses spring bolt technology to operate holding device 100 between the engaged and the disengaged conditions.

Figure 1:
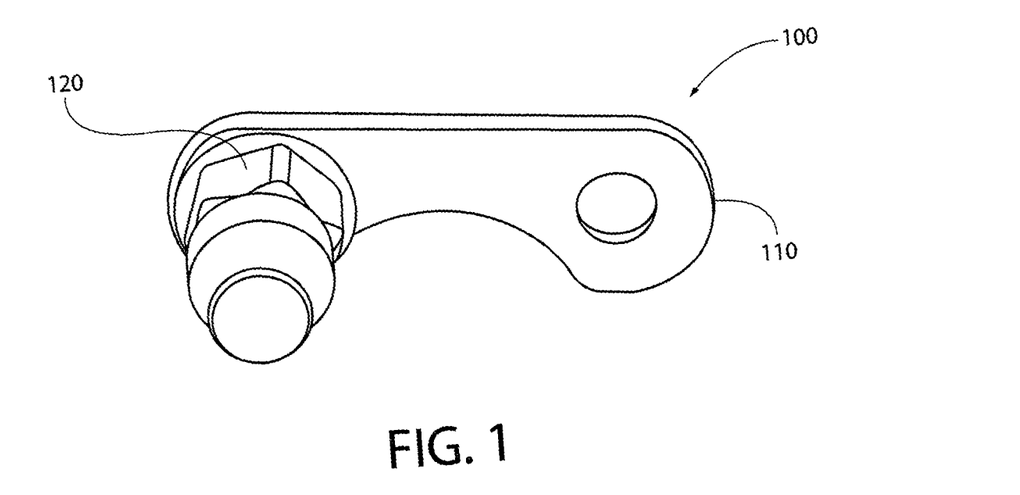
FIG. 1 is a perspective view of the clutch lever holding device according to a first exemplary embodiment of the present invention.
Figure 2:
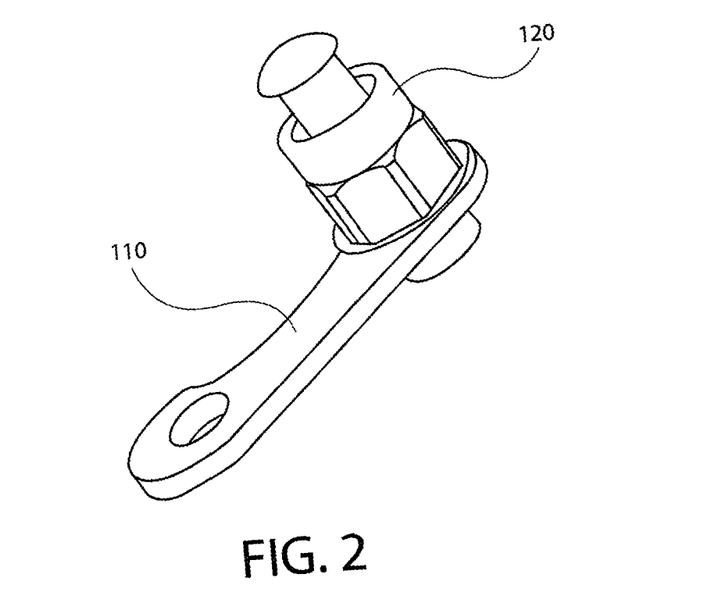
FIG. 2 is a perspective view of the clutch lever holding device from a different angle than shown in FIG. 1.
Figure 3:
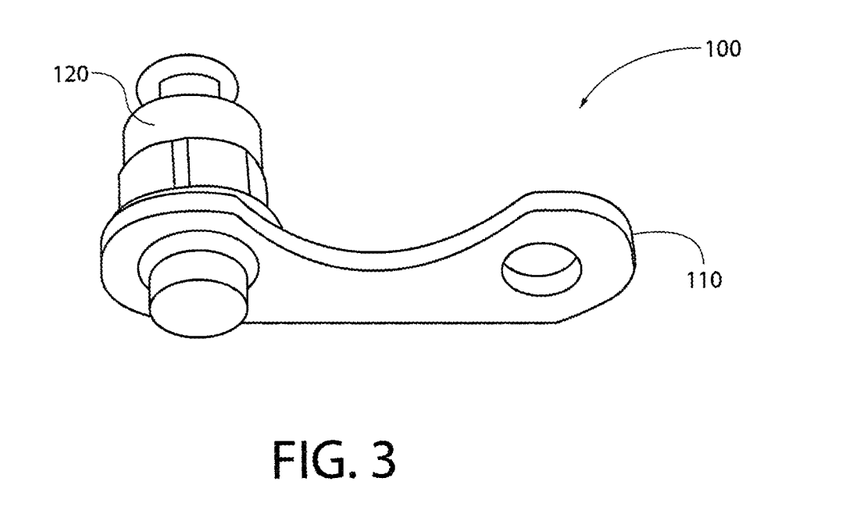
FIG. 3 is a bottom perspective view of the clutch lever holding device shown in FIG. 1.
Figure 4:
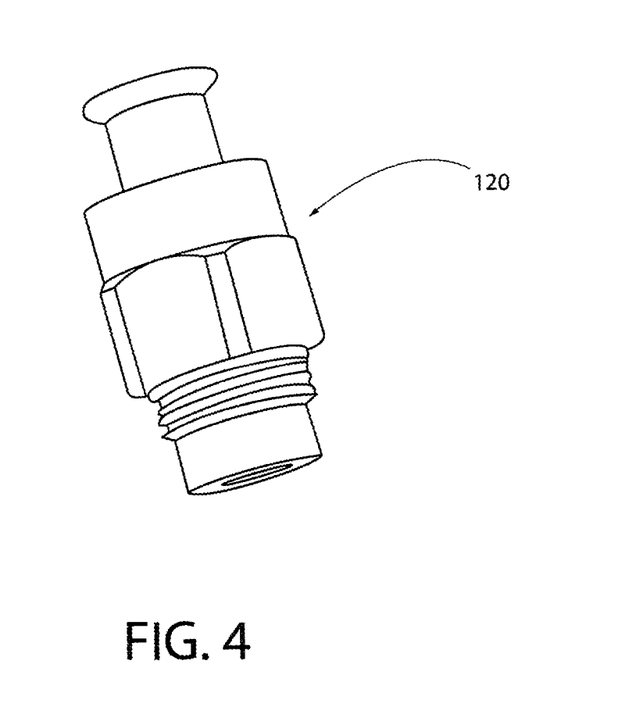
FIG. 4 is a perspective view of a spring bolt assembly used in the clutch lever holding device shown in FIG. 1.
Figure 7:
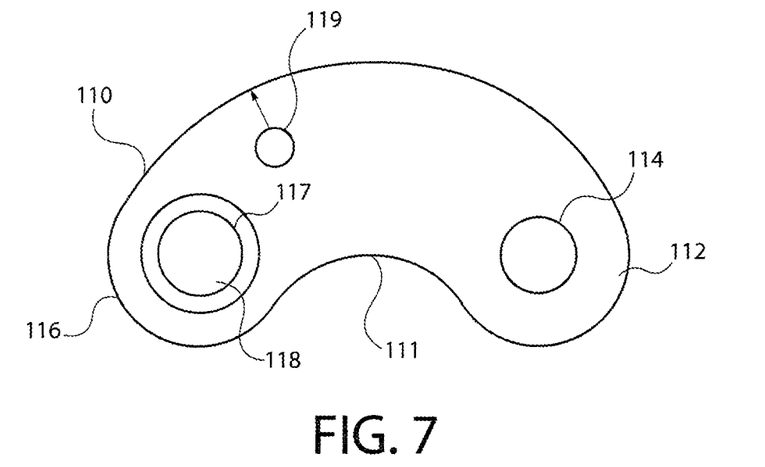
FIG. 7 is a top plan view of a first exemplary embodiment of a bracket used in the clutch lever holding device shown in FIG. 1.

Referring back to FIGS. 1-3, as well as FIG. 7, holding device 100 includes a bracket 110 that supports a spring bolt assembly 120. Bracket 110 is generally arcuate in shape and includes a first through-opening 114 at a first end 112 of bracket 110 that is used to support bracket 110 on a rear view mirror stem (shown as bolt head 62 in FIGS. 5 and 6) of the motorcycle. Bracket 110 is securely fixed to the mirror stem such that bracket 110 does not rotate or otherwise move when clutch lever 50 is operated.

A second end 116 of bracket 110 includes a second through-opening 118 that supports spring bolt assembly 120. Second through-opening 118 has internal threads 117 such that spring bolt assembly 120 is threadably connected to bracket 110. Optionally, bracket 110 can include a through-hole 119 that allows for the insertion of a securing mechanism, such as, for example, a split pin (not shown), that prevents bracket 110 from rotating about first through-opening 114. If the split pin is used, a hole must be formed in clutch perch 52 (shown in FIG. 5) on the motorcycle.

It is understood that bracket 110 may be applicable only for certain models of motorcycles. Different motorcycle models may require different brackets having different lengths than bracket 110. As such, holding device 100 may be provided as a kit, with different kits providing brackets of different lengths and/or shapes so that a user can select the proper length bracket, depending on the motorcycle model on which holding device 100 is to be installed. By way of example only and not meant to be limiting, bracket 110 can include an arcuate cut-out 111 located between first through-opening 114 and second through-opening 118. Arcuate cut-out 111 allows the installation of bracket 110 around clutch lever pivot pin 53 (shown in FIG. 6). Still alternatively, bracket 110 may be omitted in its entirety, with spring bolt assembly being directly threaded to and operable with clutch perch 52.

Figure 8:
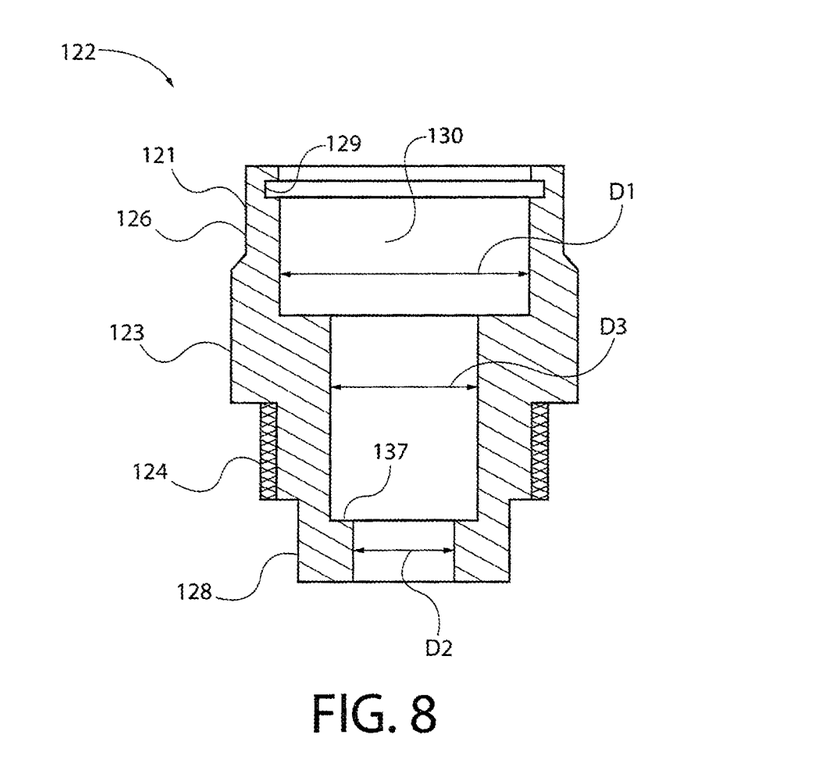
FIG. 8 is a sectional view of a sleeve used in the clutch lever holding device shown FIG. 1.

Referring now to FIG. 8 exemplary spring bolt assembly 120 includes a housing or sleeve 122 that extends through second through-opening 118 in bracket 110. Sleeve 122 includes external threads 124 that threadably engage with internal threads 117 in bracket 110.

An upper portion 126 of sleeve 122 extends upwardly from bracket 110 and lower portion 128 of sleeve 122 extends downwardly from bracket 110. A top portion 121 of sleeve 122 can be rounded while a lower portion 123 of sleeve 122 can include a hexagonal face adapted to engage securing device, such as, for example, a wrench (not shown). Sleeve 122 includes a longitudinal through-passage 130 extending therethrough.

Through-passage 130 has a first diameter D1 at upper portion 126, a second diameter D2 at lower portion 128, smaller than first diameter D1. Through-passage 130 also has a third diameter D3 between the upper portion 126 and lower portion 128 such that third diameter D3 is smaller than first diameter D1 and larger than second diameter D2. Upper portion 126 of sleeve 122 also includes a circumferential groove 129 that receives a spring clip 142 (shown in FIG. 10) inserted therein.

Figure 9:
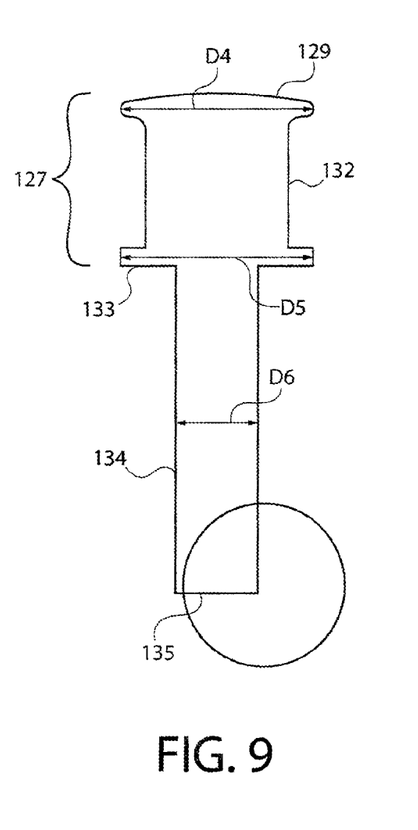
FIG. 9 is a side elevational view of a pin used in the sleeve shown in FIG. 8.

Referring to FIG. 9, a restricting pin 132 is provided for insertion into through-opening 130. Restricting pin 132 moves upward/downward along longitudinal through-opening 130. Restricting pin 132 includes a thumb portion 127 that has an upper lip 129 that extends radially around an upper portion thereof. In an exemplary embodiment, upper lip 129 has a diameter D4 such that the inner diameter of spring clip 142 is smaller than the diameter D4 of upper lip 129, although it is not necessary the inner diameter of spring clip 142 is smaller than the diameter D4 of upper lip 129.

Similarly, restricting pin 132 includes a lower lip 133 that has a diameter D5 such that the inner diameter of spring clip 142 is smaller than diameter D5 of lip 133. Further, diameter D5 is smaller than first diameter D1 larger than third diameter D3 such that thumb portion 127 cannot be depressed into third diameter D3.

Additionally, restricting pin 132 includes a shaft 134 extending downwardly from lip 133. Shaft 134 has a diameter D6 smaller than second diameter D2 such that shaft 134 can freely move within through-passage 130. Additionally, shaft 134 is sufficiently long such that, when holding device 100 is in a clutch lever disengaged position, an upper portion 129 of restricting pin 132 extends upwardly from sleeve 122 and, when holding device 100 is in a clutch lever engaged position, a lower portion 135 (shown in broken lines in FIG. 10) of shaft 134 extends downwardly from sleeve 122. In an exemplary embodiment, lower portion 135 extends about ¼" out of sleeve 122.

Figure 9A:
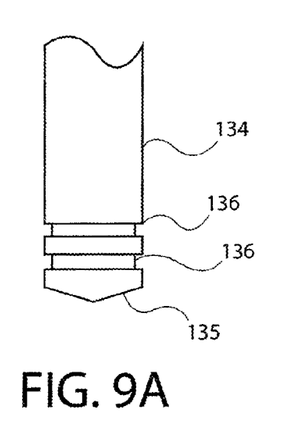
FIG. 9A is an enlarged view of an optional lower end of the pin shown in FIG. 9.

Optionally, as shown in FIG. 9A, lower portion 135 of shaft 134 can include a plurality of grooves 136 formed around an outer circumference thereof. Grooves 136 can enhance the frictional engagement of lower portion 135 of shaft 134 with clutch lever 50 when holding device 100 is engaged.

Figure 10:
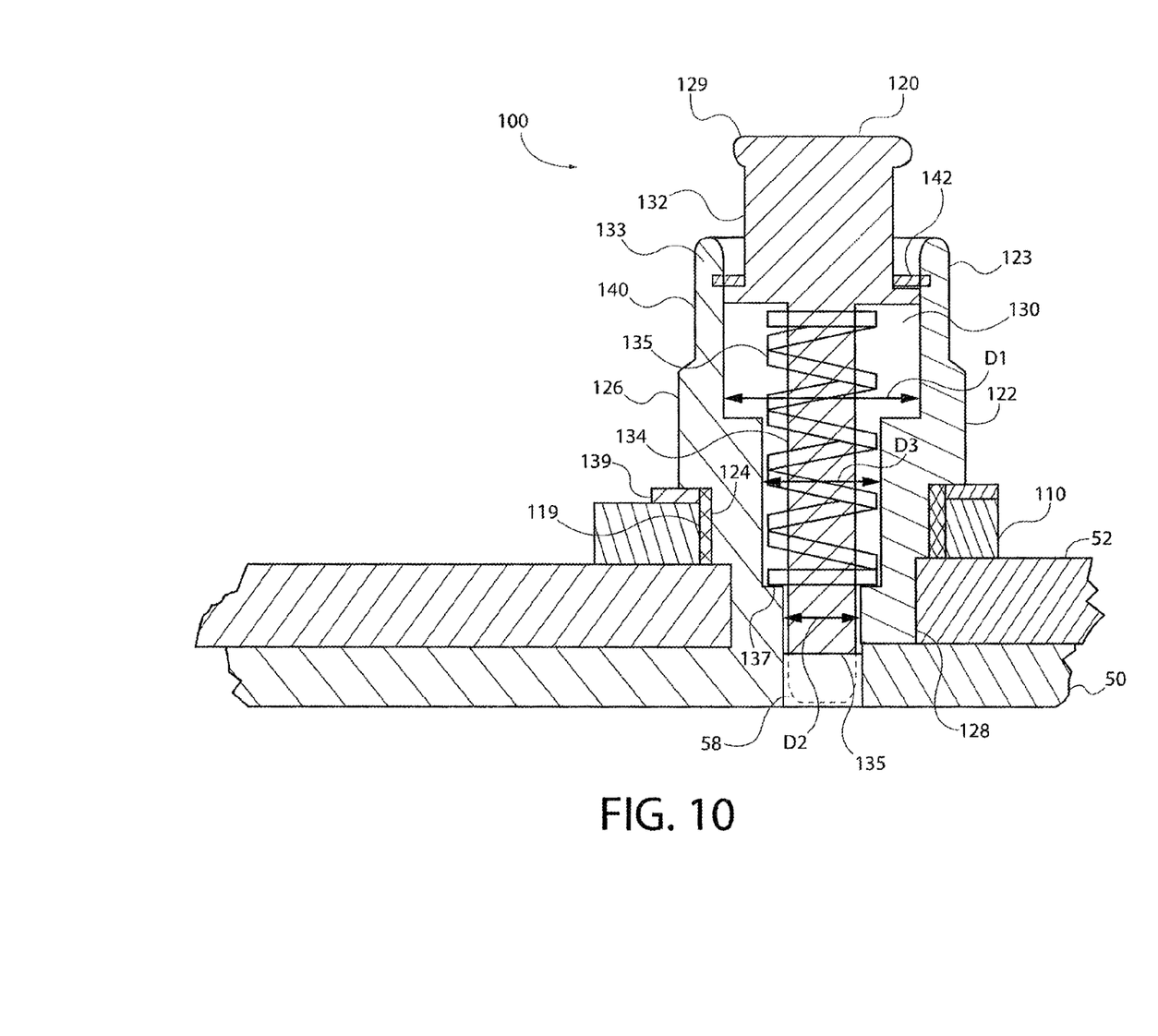
FIG. 10 is a sectional view of the clutch lever holding device shown in FIG. 1.

Referring to FIG. 10, in which holding device 100 is in a fully assembled condition, pin 132 is biased in the upward position by a biasing member, such as, for example, a helical spring 135, that surrounds at least a portion of restricting pin 132. A lower portion of helical spring 135 rests on lower lip 137 in sleeve through-opening 130. An upper portion of helical spring 135 biases against lower lip 133 of restricting pin 132 to bias restricting pin 132 upwardly.

Optionally, a washer 139 is disposed over sleeve 122 and rests on bracket 110. Spring clip 142 extends at least partly over first diameter D1 of through-passage 130 such that, when spring 135 biases lower lip 133 of restricting pin 132 upwardly, spring clip 142 retains restricting pin 132 within sleeve 122.

While an exemplary spring bolt assembly 120 is shown and described above, those skilled in the art will recognize that other configurations of spring bolt assemblies can be used within the scope of the present invention. For example, instead of spring clip 142 being used to restrict pin 132 from moving upwardly, upper portion 126 of sleeve 122 can be crimped inwardly sufficiently enough to engage lip 133 of restricting pin 132 to retain restricting pin 132 within sleeve 122.

Figure 11:
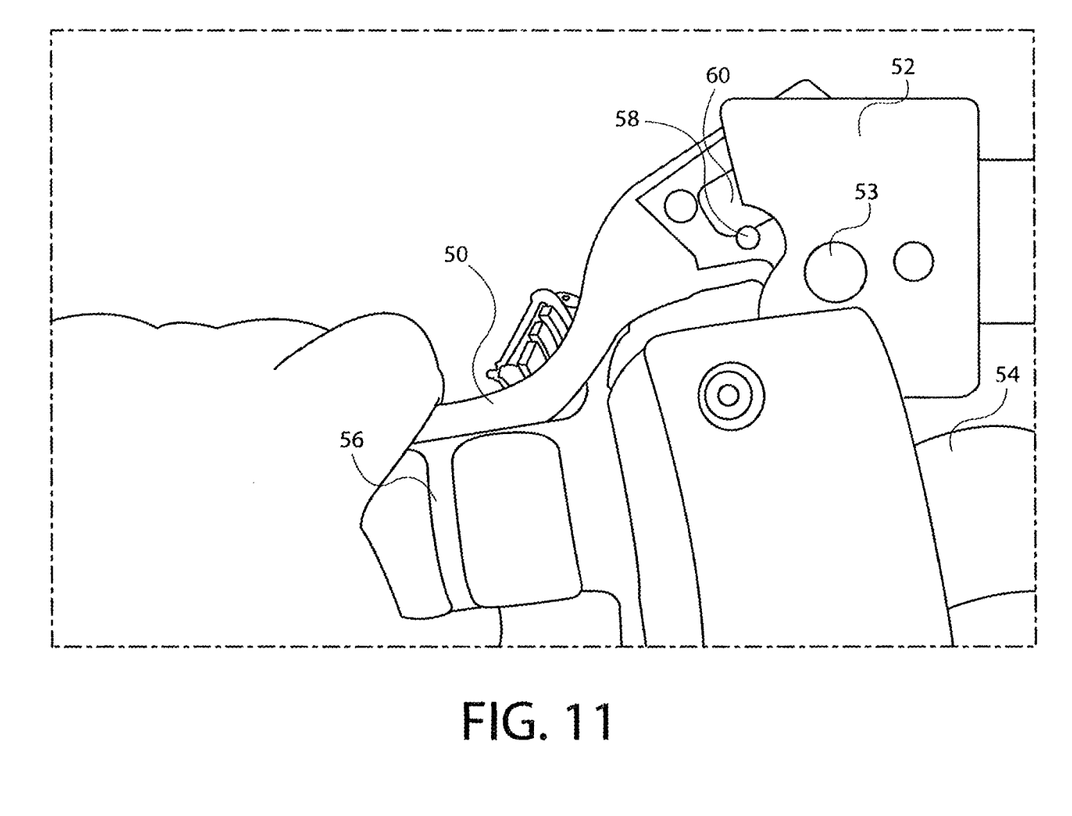
FIG. 11 is a perspective view of the clutch lever shown in FIG. 5, with the clutch lever holding device removed.

Referring to FIG. 11, clutch lever 50 is pivotally mounted on clutch perch 52 via clutch lever pivot pin 53 such that, when operating clutch lever 50 between the clutch engaged and the clutch disengaged position, clutch lever 50 pivots about clutch lever pivot pin 53. Clutch lever 50 is biased toward the clutch engaged position. A rider must grip clutch lever 50 and pull clutch lever 50 toward a handlebar handle 56, mounted on a handlebar 54, in order to disengage the clutch. Clutch lever 50 includes a cavity 58 into which holding device 100 extends when holding device 100 is activated to engage clutch lever 50. Clutch perch 52 is attached to handlebar 54 via a clutch perch mount 60.

Holding device 100 can be directly integrated into clutch perch 52 by a motorcycle clutch perch manufacturer or a motorcycle manufacturer as part of the original equipment on the motorcycle. Alternatively, holding device 100 can be added to the motorcycle as an "after-market" add-on. In an exemplary method, in order to use holding device 100 as an after-market add-on, cavity 58 must be formed (i.e., drilled) in clutch lever 50 for the lower portion of restricting pin 132 to fit therein.

Figure 12:
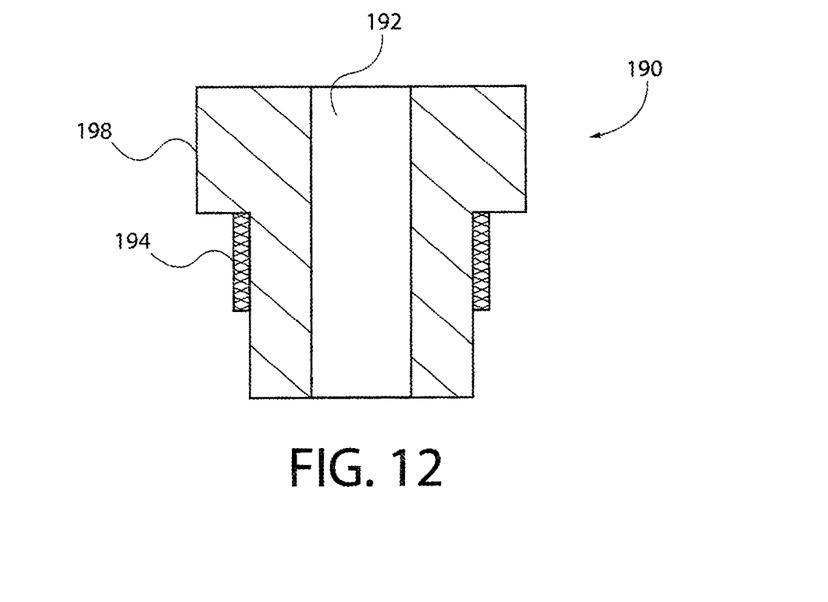
FIG. 12 is a sectional view of a drill fixture for use with the clutch lever holding device of the present invention.

To ensure that the hole is located in the proper position, a drill fixture 190 is provided with holding device 100 as part of a kit. An exemplary drill fixture 190 is shown in FIG. 12. Drill fixture 190 is used to drill cavity 58 in clutch lever 50.

Drill fixture 190 includes a through-opening 192 to allow a drill bit (not shown) to extend therethrough. In an exemplary embodiment, through-opening 192 is about ¹³⁄₆₄" in diameter. External threads 194 are sized to threadably engage threads 117 on bracket 110. A hex head 198 provides a gripping surface to thread drill fixture 190 onto or from bracket 110.

In an exemplary method of using drill fixture 190 to form cavity 58, the user removes the left side mirror stem from clutch perch 52. The user then installs bracket 110 by inserting the mirror stem through first through-opening 112 of bracket 110. User then inserts the mirror stem into clutch perch mirror mount hole (shown in FIG. 11). The user next aligns bracket 110 such that second through-opening 118 is pointing toward clutch lever 50.

The user pulls clutch lever 50 to the clutch disengage position (shown in FIG. 11) and secures clutch lever 50 to handlebar handle 56, such as with tie wrap (not shown). It is desired that lever 50 is centered to handlebar handle 56 before making the tie wrap completely tight. The user ensures that bracket 110 is aligned so that the second through-hole 118 is completely clear of clutch perch 52 and clutch lever 50 can be seen when looking vertically downward through second through-opening 118.

Drill fixture 190 is threaded into threads 117 of bracket 110 and drill fixture 190 is screwed down completely until threads 194 bottom out. Bracket 110 is pivoted clockwise about the mirror stem until drill fixture 190 is in contact with clutch perch 52 under bracket 110. The user then fully tightens the mirror stem onto clutch perch 52. The user inserts a drill bit (not shown) into through-opening 192 until the drill tip is in contact with clutch lever 50 and measures up about ⅜" from where drill exits drill fixture 190 and mark the drill with a wrap of electrical tape (not shown). This will be the drill depth. The user removes the drill bit and secures the drill bit into an electric drill (not shown).

Next, the user inserts the drill into drill fixture 190, making the drill as perpendicular to drill fixture 190 and bracket 110 as possible. The user starts the drill slowly while maintaining perpendicularity. After the hole is spotted, the speed is carefully increased and cavity 58 is drilled into the clutch lever 50 through drill fixture 190 until the electrical tape reaches the head of drill fixture 190. The mirror stem and bracket 110 are removed from clutch perch 52. Optionally, drill fixture 190 can be removed from bracket 110 and sleeve 122 is threaded onto bracket 110. Bracket 110 is secured to the mirror stem as described above, with second through-opening 118 vertically aligned with cavity 58 when clutch lever 50 is in the clutch disengaged position.

To use holding device 100, a rider engages clutch lever 50 in the clutch engaged position with his/her left hand and squeezes clutch lever 50 toward handlebar handle 56, thereby disengaging the clutch. Using his/her index finger, the rider fully depresses restricting pin 132 downwardly such that upper portion 129 of restricting pin 132 is pushed completely into sleeve 122 and lower end 135 of restricting pin 132 extends downwardly and outwardly from sleeve 122 and into cavity 58, as shown in FIG. 10. The rider, while still depressing restricting pin 132, releases clutch lever 50. Clutch lever 50 slightly biases toward the clutch engaged position, but lower end 135 of restricting pin 132 is forced against the wall of cavity 58. Frictional engagement between restricting pin 132 and the wall of cavity 58 prevents spring 135 from biasing restricting pin 132 upwardly, thereby securing clutch lever 50 in the disengaged position.

To disengage holding device 100 and release clutch lever 50 to the clutch engaged position, the rider, without depressing restricting pin 132, squeezes clutch lever 50 toward handlebar handle 56, removing the frictional force between restricting pin 132 and the wall of cavity 58. Spring 135 biases restricting pin 132 upwardly such that lower end 135 of restricting pin 132 moves upward and out of cavity 58, and restricting pin 132 disengages from clutch lever 50. The rider then releases clutch lever 50, allowing clutch lever 50 to be biased to the engaged position.

In an alternative method, instead of drilling cavity 58 in clutch lever 50, holding device 100 can be mounted such that, when clutch lever 50 is moved to the clutch engaged position, restricting pin 132 engages the leading edge of clutch lever 50, preventing clutch lever 50 from returning to the clutch engaged position. In order to move restricting pin 132, the operator pulls clutch lever 50 toward handlebar handle 56, such that spring 135 biases restricting pin 132 upwardly, and out of the way of clutch lever 50 so that, when the operator releases clutch lever 50, clutch lever 50 moves to the clutch engaged position.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A clutch lever holding assembly comprising:
   a spring bolt assembly comprising:
      an elongate housing having a top end, a bottom end, and a through passage extending between the top end and the bottom end, the through passage having a first diameter at the top end, a second diameter at the bottom end, smaller than the first diameter, and a third diameter between the top end and the bottom end, the third diameter being smaller than the first diameter and larger than the second diameter;
      a securing pin extending through the through passage, the securing pin having a thumb portion and a clutch lever engaging portion, wherein the clutch lever engaging portion comprises a plurality of ribs, the thumb portion having a diameter smaller than the first diameter and larger than the third diameter, and the clutch lever engaging portion having a diameter smaller than the second diameter; and
      a biasing member disposed in the first and second diameters of the through passage, the biasing member biasing the securing pin in an upward position.

2. The clutch lever holding assembly according to claim 1, wherein the thumb portion comprises a lower lip.

3. The clutch lever holding assembly according to claim 2, wherein the top end of the housing includes a retainer having an inner diameter smaller than the diameter of the lower lip.

4. The clutch lever holding assembly according to claim 1, wherein, when the securing pin is biased in a downward position, the clutch lever engaging portion extends outwardly from the bottom end of the housing.

5. The clutch lever holding assembly according to claim 1, wherein the housing is threadably connected to the bracket.

6. The clutch lever holding assembly according to claim 1, wherein the through passage includes a lower lip disposed between the second diameter and the third diameter such that the biasing member sits on the lower lip.

7. The clutch lever holding assembly according to claim 1, wherein the top end of the housing includes a retaining clip, and wherein the biasing member biases the securing pin against the retaining clip.

8. The clutch lever holding assembly according to claim 1, wherein the housing further comprises a plurality of external threads located above the second diameter.

9. The clutch lever holding assembly according claim 8, wherein the plurality of external threads engage the clutch lever engaging opening.

10. A kit comprising:
   a. a clutch lever holding assembly comprising:
      a bracket having a first end and a second end, the first end having a clutch lever engaging opening;
      a spring bolt assembly extending through the clutch lever engaging opening, the spring bolt assembly comprising:
         an elongate housing having a top end, a bottom end, and a through passage extending between the too end and the bottom end, the through passage having a first diameter at the top end, a second diameter at the bottom end, smaller than the first diameter, and a third diameter between the top end and the bottom end, the third diameter being smaller than the first diameter and larger than the second diameter;
         a securing pin extending through the through passage, the securing pin having a thumb portion and a clutch lever engaging portion, the thumb portion having a diameter smaller than the first diameter and larger than the third diameter, and the clutch lever engaging portion having a diameter smaller than the second diameter; and
         a biasing member disposed in the first and second diameters of the through passage, the biasing member biasing the securing pin in an upward position; and
   b. a drill fixture having a passage extending therethrough being usable to locate a hole that the clutch lever holding device can engage, wherein the drill fixture has a plurality of external threads sized to fit into the clutch lever engaging opening.

\* \* \* \* \*